(12) United States Patent
Berkcan et al.

(10) Patent No.: US 8,294,597 B2
(45) Date of Patent: Oct. 23, 2012

(54) SELF REGULATING POWER CONDITIONER FOR ENERGY HARVESTING APPLICATIONS

(75) Inventors: Ertugrul Berkcan, Clifton Park, NY (US); Emad Andarawis, Ballston Lake, NY (US); Samantha Rao, Bangalore (IN); Eladio Delgado, Burnt Hills, NY (US); Robert Wojnarowski, Ballston Lake, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 933 days.

(21) Appl. No.: 12/365,687

(22) Filed: Feb. 4, 2009

(65) Prior Publication Data
US 2010/0194600 A1   Aug. 5, 2010

(51) Int. Cl.
*G01C 21/00* (2006.01)
(52) U.S. Cl. .................................... 340/971; 340/635

(58) Field of Classification Search ............... 340/971, 340/635, 636.1, 636.19, 636.11–636.15, 340/637, 660, 661, 952, 425.5, 426.25, 438
See application file for complete search history.

(56) References Cited

U.S. PATENT DOCUMENTS

| | | | |
|---|---|---|---|
| 5,781,448 A * | 7/1998 | Nakamura et al. | 700/293 |
| 7,109,875 B2 * | 9/2006 | Ota et al. | 340/635 |
| 7,849,344 B2 * | 12/2010 | Karstens | 713/340 |
| 8,098,143 B2 * | 1/2012 | Andarawis et al. | 340/425.5 |
| 2008/0101078 A1 * | 5/2008 | Stokes | 362/470 |

* cited by examiner

*Primary Examiner* — Anh V La
(74) *Attorney, Agent, or Firm* — Bracewell & Giuliani LLP

(57) ABSTRACT

Monitoring systems, sensor nodes, and methods of operating a system for monitoring one or more operating conditions of a structure, are provided. An exemplary monitoring system includes one or more sensor nodes each including a power supply, a sensor configured to sense whether or not the power level of the power supply, and a communications interlace for communicating sensed operating conditions. The system also includes a controller in communication with the sensor nodes through a communication network to monitor the sensor nodes.

48 Claims, 16 Drawing Sheets

SELF REGULATING POWER CONDITIONER FOR ENERGY HARVESTING APPLICATIONS

CROSS-REFERENCE TO RELATED APPLICATIONS

This application is related to U.S. patent application Ser. No. 12/208,222, filed on Sep. 10, 2008, the disclosure of which is incorporated herein by reference.

BACKGROUND

This disclosure relates to monitoring systems for aircraft.

DETAILED DESCRIPTION

Figure 1:
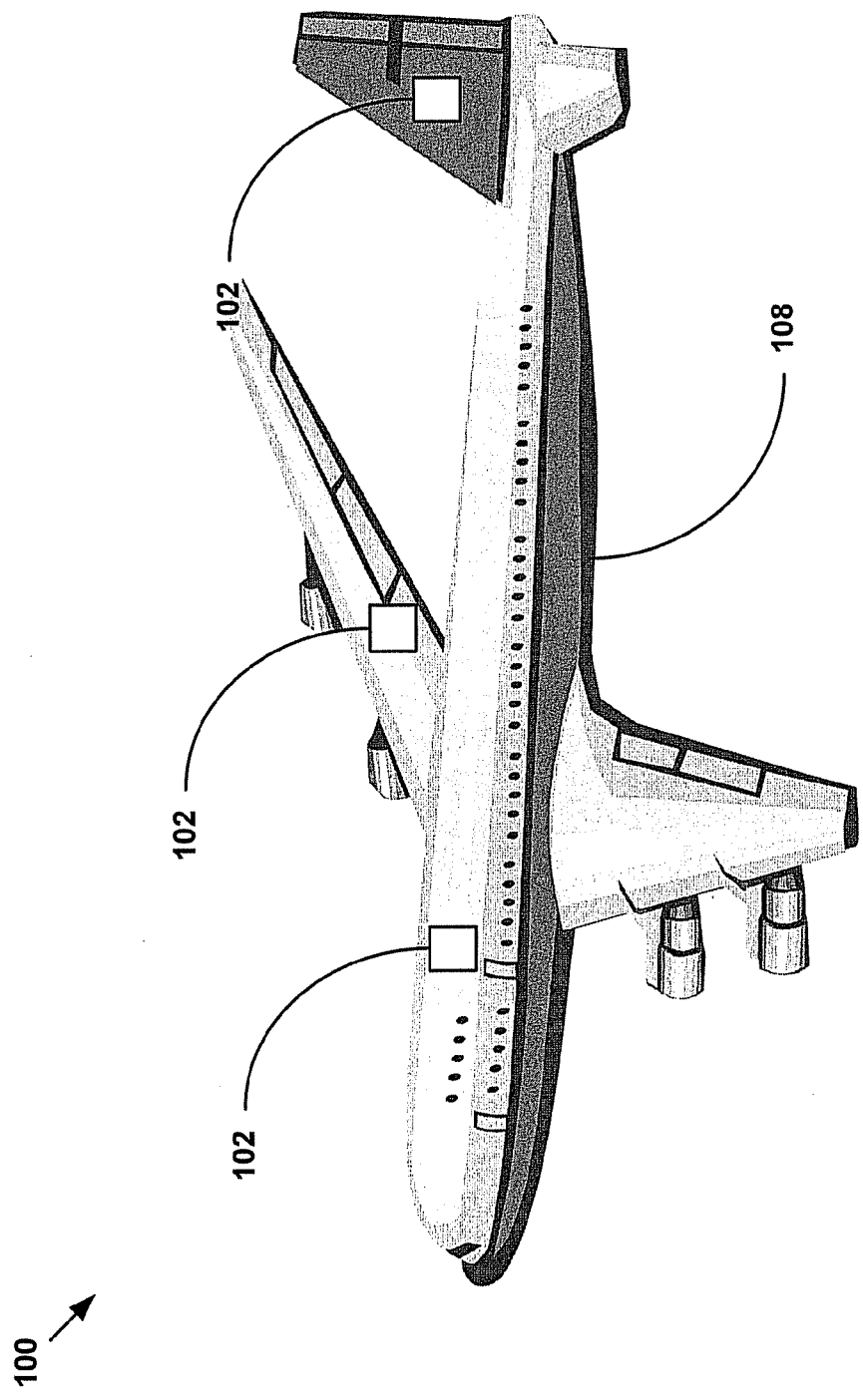
FIG. 1 is an illustration of an exemplary embodiment of an aircraft monitoring system.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 2:
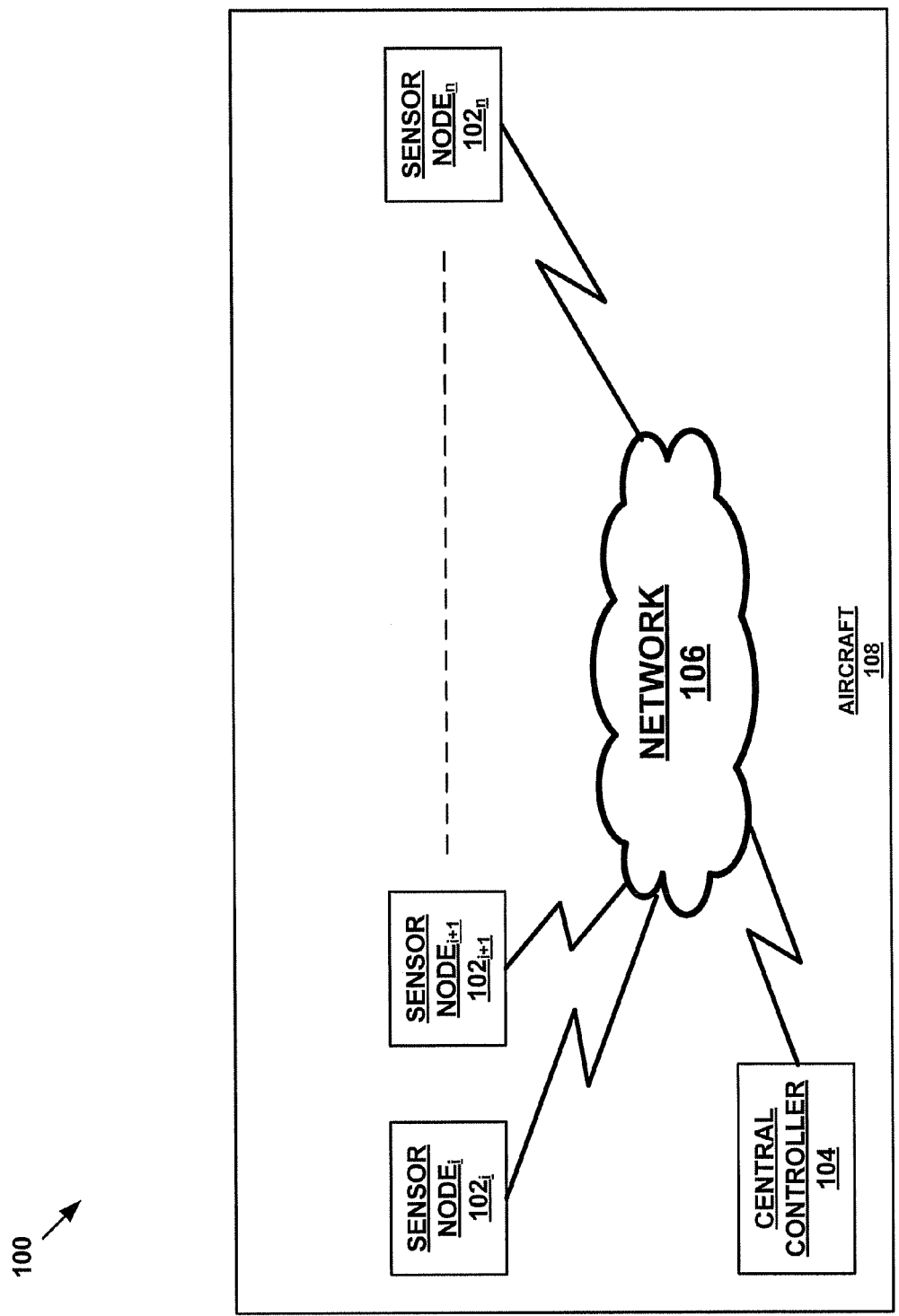
FIG. 2 is a schematic illustration of the aircraft monitoring system of FIG. 1.
Figure 3:
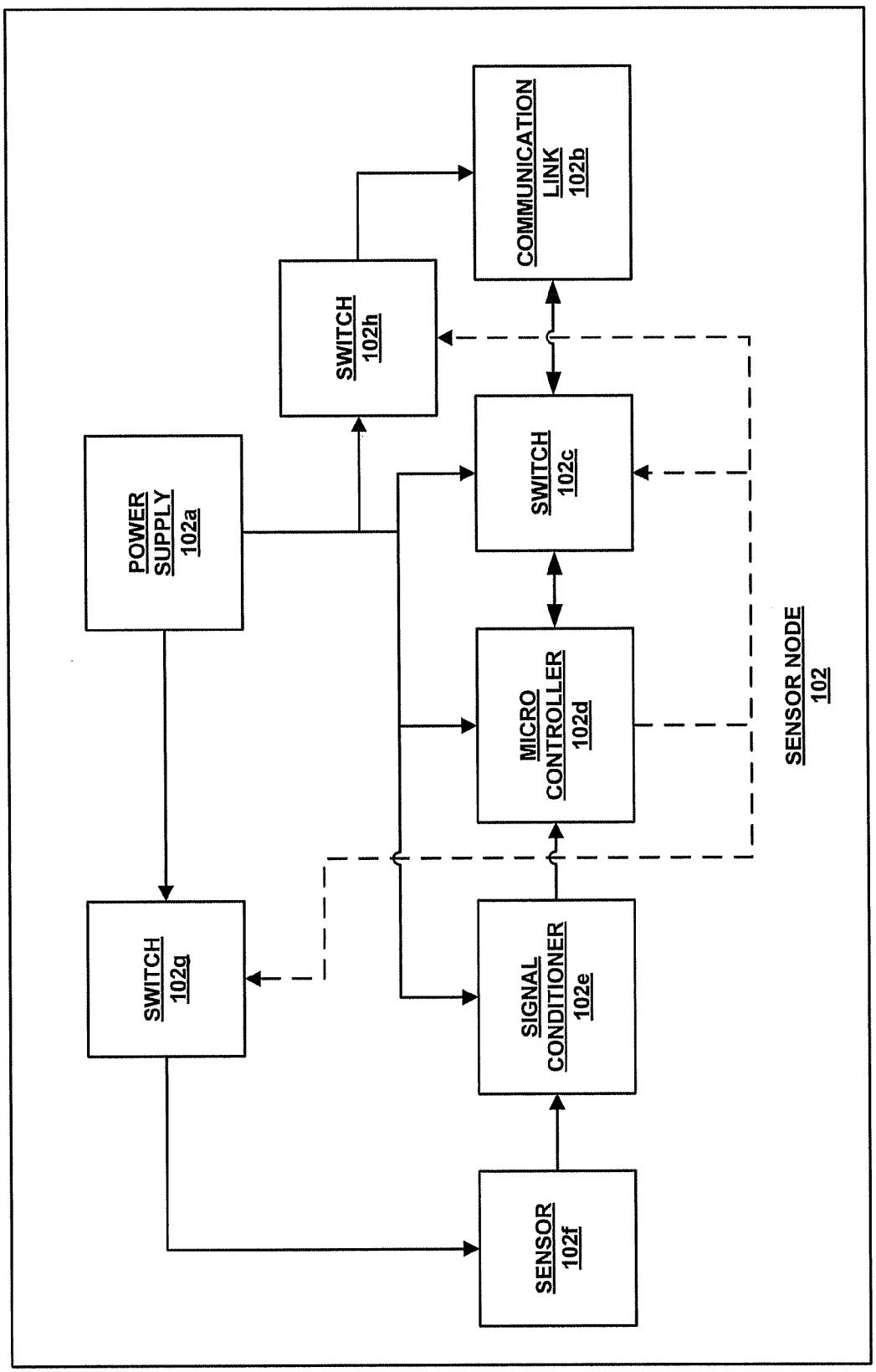
FIG. 3 is a schematic illustration of an exemplary embodiment of sensor nodes of the aircraft monitoring system of FIG. 2.

Referring to FIGS. 1-3, an exemplary embodiment of a system 100 for monitoring an aircraft includes one or more sensors nodes 102 that are operably coupled to a central controller 104 by a network 106. In an exemplary embodiment, the sensor nodes 102 are distributed within an aircraft 108 for monitoring one or more operational states of the aircraft that may, for example, include stresses, strains, temperatures, and pressures. In an exemplary embodiment, one or more of the sensor nodes 102 communicate the operational states of the aircraft 108 to the central controller 106 that is housed within the aircraft using, for example, a network 106 that may, for example, include a hard wired, fiber optic, infra red, radio frequency, acoustic, or other communication pathway.

In an exemplary embodiment, each sensor node 102 includes a power supply 102a that is adapted to scavenge energy from the immediate environment. In an exemplary embodiment, the power supply 102a may, for example, scavenge electromagnetic energy, vibrational energy, heat energy, and/or wind energy from the immediate environment. In an exemplary embodiment, the power supply 102a is operably coupled, and supplies power, to a communication link 102b, a switch 102c, a micro-controller 102d, a signal conditioner 102e, a sensor 102f, a switch 102g, and a switch 102h.

In an exemplary embodiment, the communication link 102b is also operably coupled to the switch 102c and adapted to transmit and receive communication signals between the sensor node 102 and the network 106. In this manner, the sensor node 102 may communicate with other sensor nodes and the central controller 104.

In an exemplary embodiment, the switch 102c is also operably coupled to the communication link 102b and the micro-controller 102d and adapted to be controlled by the micro-controller to thereby communications between the communication link and the micro-controller. In this manner, in the event that the micro-controller 102d determines that communication should not occur between the communication link 102b and the micro-controller such as, for example, if the sensor node 102 lacks sufficient power, the micro-controller may operate the switch to prevent communication between the communication link and the micro-controller. In an exemplary embodiment, the switch 102c may, for example, be a mechanical, electrical, or a logical switch.

In an exemplary embodiment, the micro-controller 102d is also operably coupled to the communication link 102b, the switch 102c, the signal conditioner 102e, the sensor 102f, and the switch 102g for monitoring and controlling the operation of each. In an exemplary embodiment, the micro-controller 102d may include, for example, a conventional general purpose programmable controller.

In an exemplary embodiment, the signal conditioner 102e is also operably coupled to the micro-controller 102d and the sensor 102 and adapted to condition signals transmitted by the sensor before they are further processed by the micro-controller. In an exemplary embodiment, the signal conditioner 102e may, for example, include one or more conventional signal processing elements such as, for example, filters, amplifiers, and analog to digital converters.

In an exemplary embodiment, the sensor 102f is also operably coupled to the signal conditioner 102e and the switch 102g and adapted to sense one or more operating conditions of the aircraft 108 in the immediate environment. In an exemplary embodiment, the sensor 102f may include, for example, one or more of the following: a strain gauge, a stress sensor, a temperature gauge, a pressure gauge, a radiation detector, a radar detector, a chemical detector, a corrosion detector, and/or a detector of electromagnetic energy.

In an exemplary embodiment, the switch 102g is also operably coupled to the micro-controller 102d and the sensor 102f and adapted to control the operation of the sensor under the controller of the micro-controller. In this manner, in the event that the micro-controller 102d determines that the sensor 102f should not operate such as, for example, if the sensor node 102 lacks sufficient power, the micro-controller may operate the switch 102g to prevent power from being supplied by the power supply 102a to the sensor.

In an exemplary embodiment, the switch 102h is also operably coupled to the micro-controller 102d and the communication link 102b and adapted to control the operation of the communication link under the controller of the micro-controller. In this manner, in the event that the micro-controller 102d determines that the communication link 102b should not operate such as, for example, if the sensor node 102 lacks sufficient power, the micro-controller may operate the switch 102h to prevent power from being supplied by the power supply 102a to the communication link.

Figure 4A:
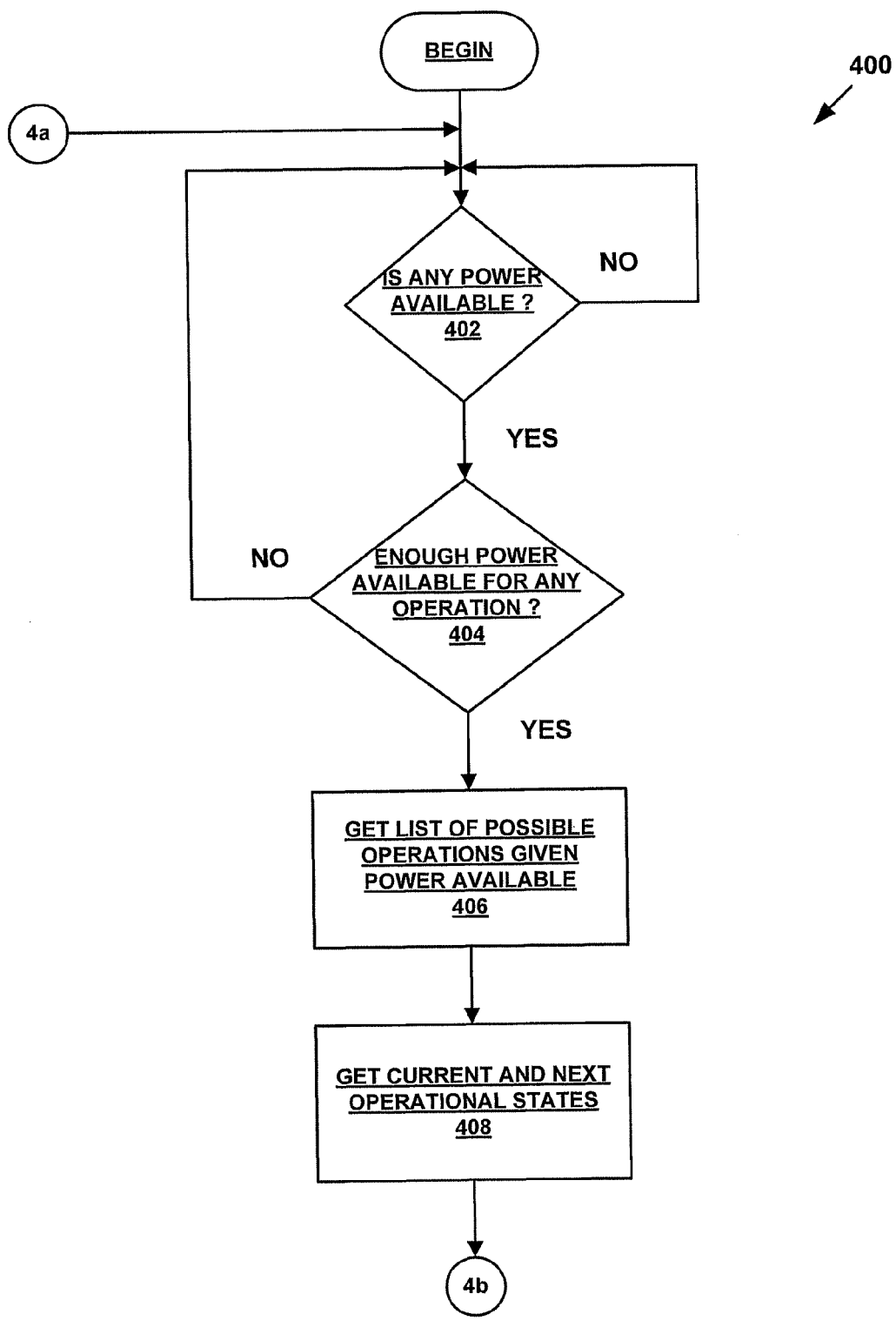
FIGS. 4a and 4b are flow chart illustrations of an exemplary embodiment of a method of operating the sensor nodes of FIG. 3.
Figure 4B:
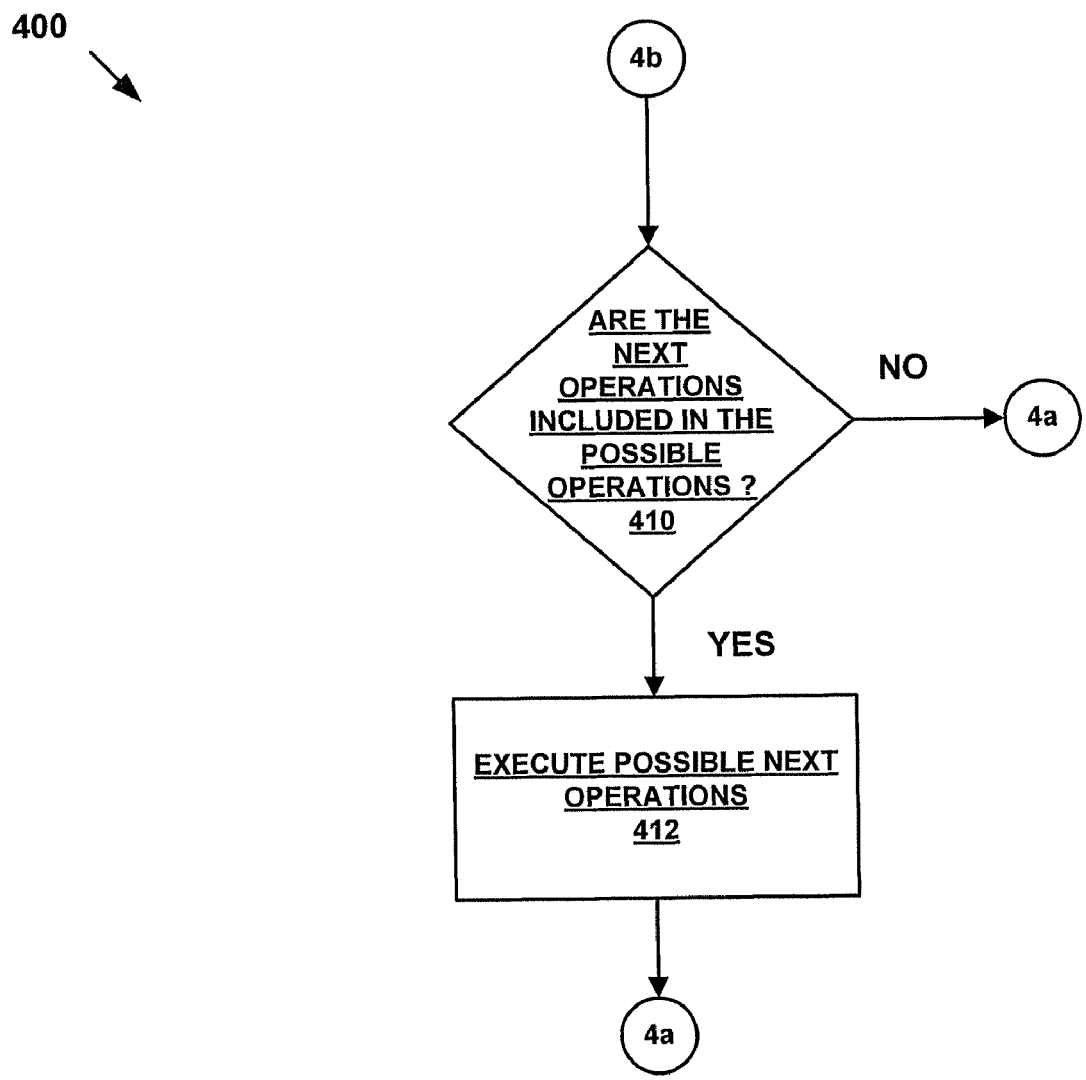

Referring now to FIGS. 4a and 4b, in an exemplary embodiment, one or more of the sensor nodes 102 of the system 100 implement a method 400 of operating in which, in 402, the sensor node determines if there is any power available to the sensor node. If there is any power available to the sensor node 102, then the sensor node determines if there is enough power available to the sensor node to permit the sensor node to execute at least one operation in 404.

If there is enough power available to permit the sensor node 102 to execute at least one operation, then the sensor node gets a listing of the possible operations given the amount of available power in 406. The sensor node 102 then gets a listing of the current and next operational states for the sensor node in 408.

The sensor node 102 then determines if the next operational states of the sensor node are included in the possible operations given the amount of available power in 410. If the next operational states of the sensor node 102 are included in the possible operations given the amount of available power, then the sensor node executes the next operational states that are possible to execute given the amount of available power in 412.

Figure 5A:
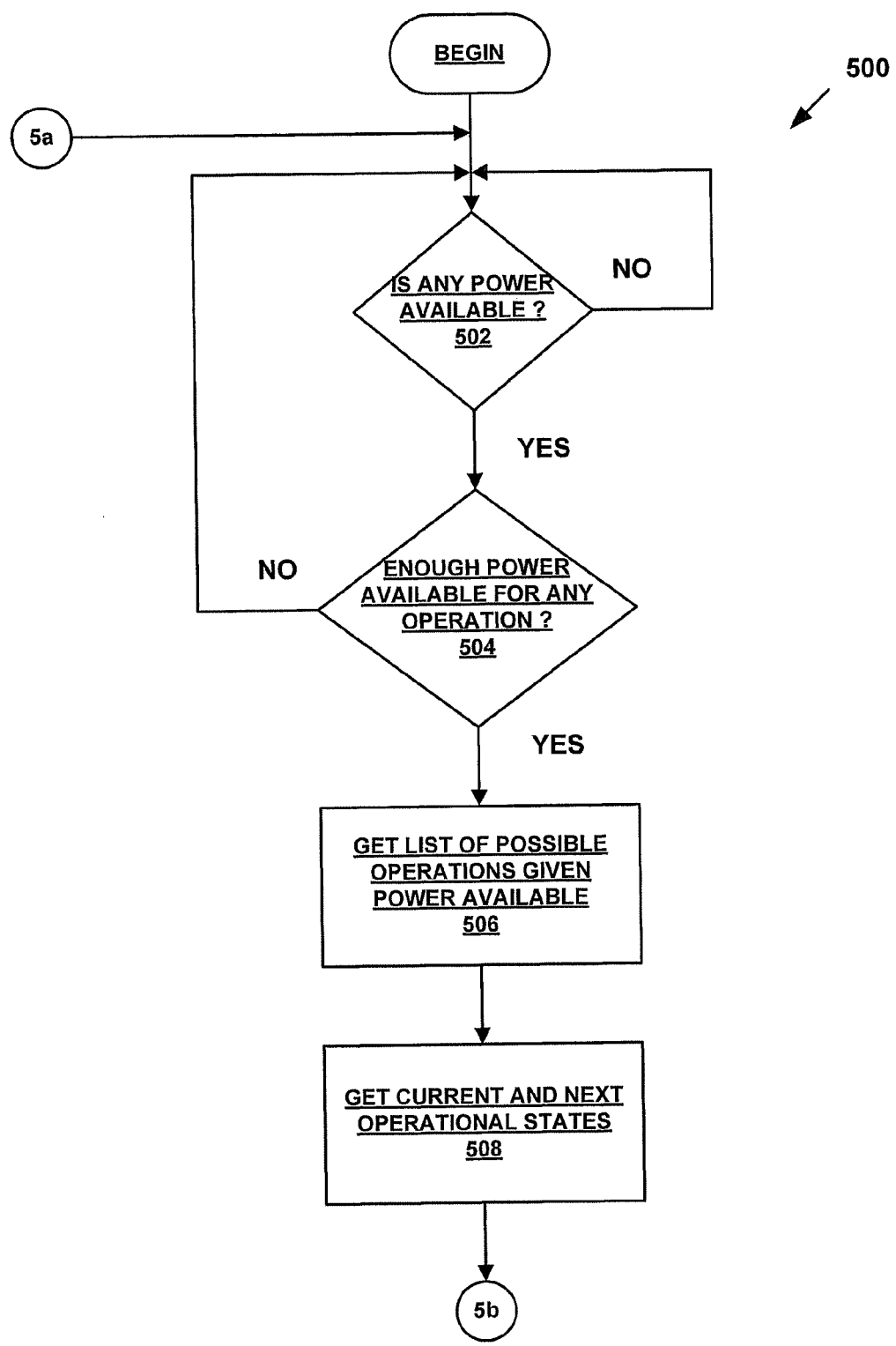
FIGS. 5a and 5b are flow chart illustrations of an exemplary embodiment of a method of operating the sensor nodes of FIG. 3.
Figure 5B:
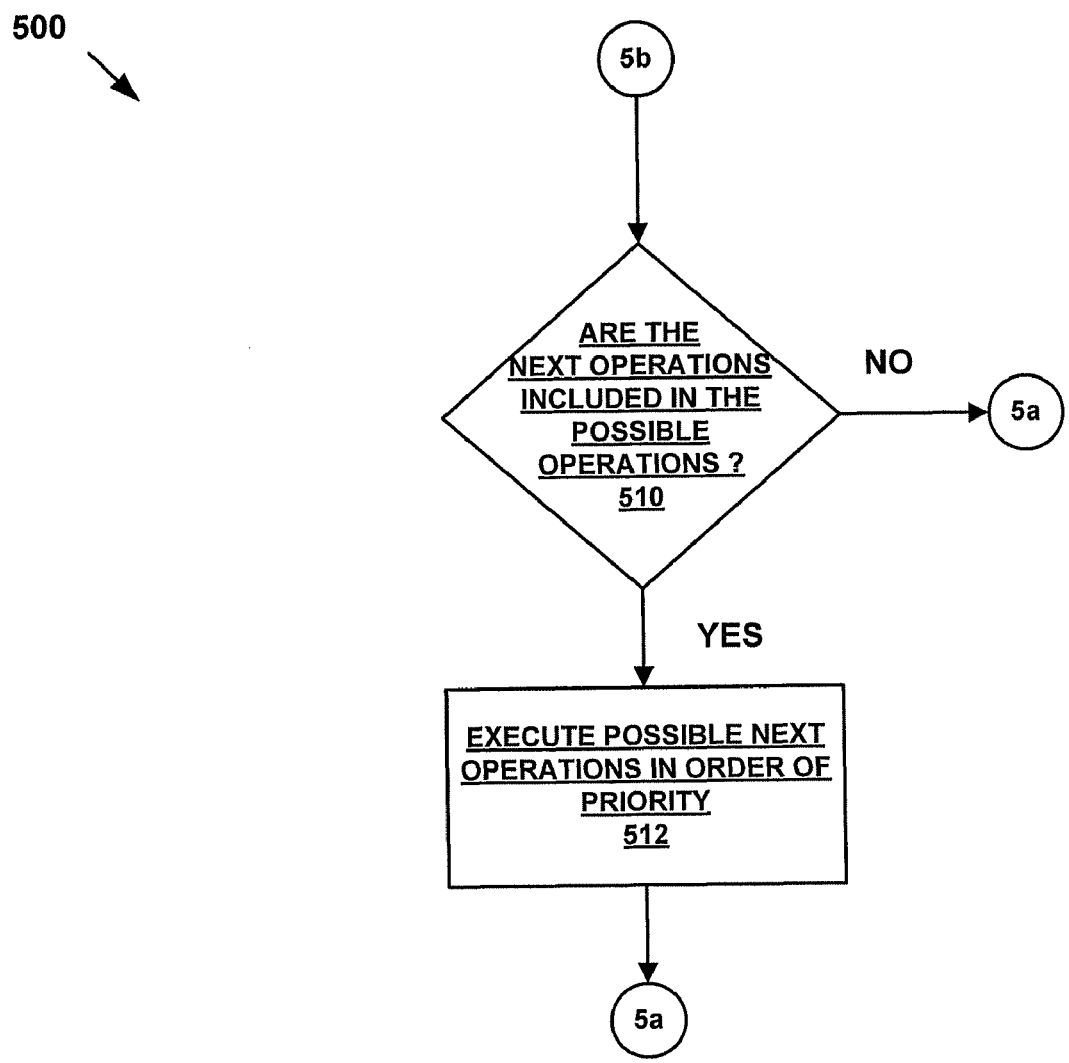

Referring now to FIGS. 5a and 5b, in an exemplary embodiment, one or more of the sensor nodes 102 of the system 100 implement a method 500 of operating in which, in 502, the sensor node determines if there is any power available to the sensor node. If there is any power available to the sensor node 102, then the sensor node determines if there is enough power available to the sensor node to permit the sensor node to execute at least one operation in 504.

If there is enough power available to permit the sensor node 102 to execute at least one operation, then the sensor gets a listing of the possible operations given the amount of available power in 506. The sensor node 102 then gets a listing of the current and next operational states for the sensor node in 508.

The sensor node 102 then determines if the next operational states of the sensor node are included in the possible operations given the amount of available power in 510. If the next operational states of the sensor node 102 are included in the possible operations given the amount of available power, then the sensor node executes the next operational states, based upon their pre-determined priority, that are possible to execute given the amount of available power in 512.

In an exemplary embodiment, one factor used to weigh the priority of the next operational state is based on power usage. In this embodiment, power usage is defined as ($Power_{In}$ - $Power_{Out}$) divided by (Energy Inertia). $Power_{In}$ is the power available from the power supply. $Power_{Out}$ is the power used by the sensor node for operations such as, for example, sensing an operating condition or communicating the sensed operating condition through the communication network. Energy Inertia is a factor indicating how much energy is required to change from one operation to another.

Figure 6:
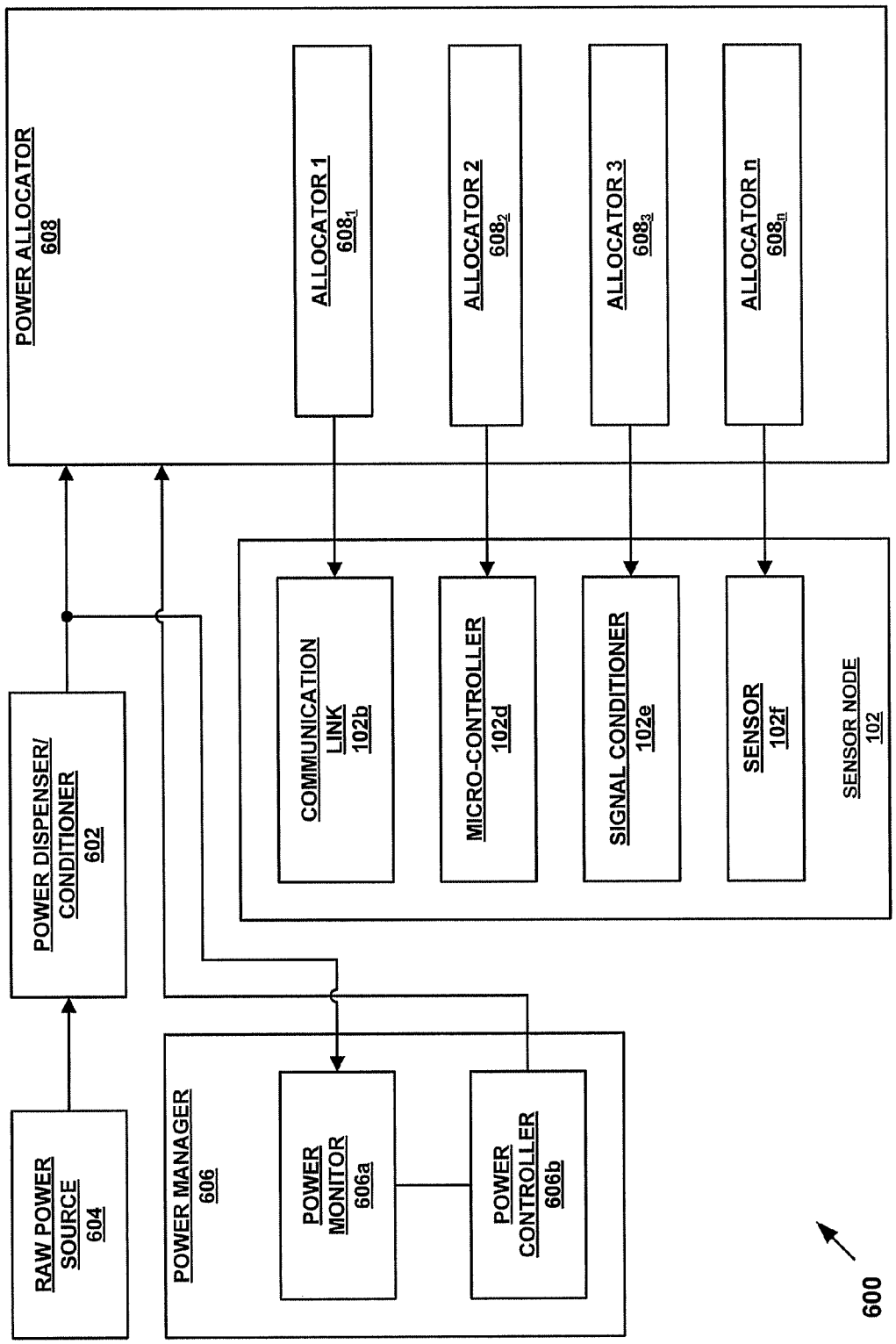
FIG. 6 is a schematic illustration of an exemplary embodiment of an aircraft monitoring system.

Referring now to FIG. 6, an exemplary embodiment of a system 600 for monitoring an aircraft is substantially identical in design and operation as the system 100 with the addition of a power dispenser and conditioner 602 that is operably coupled to a source of raw power 604, a power manager 606, and a power allocator 608.

In an exemplary embodiment, the source of raw power 608 may include one or more of the power supplies 102a of one or more of the sensor nodes 102. In an exemplary embodiment, the power dispenser and conditioner 602 is adapted to receive time varying raw power, $P(t)_{raw}$, from the source of raw power 604, condition the raw power, and then transmit time varying available power, $P(t)_{avail}$, to the power allocator 608. In an exemplary embodiment, the power dispenser and conditioner 602 includes one or more elements for conditioning the raw power such as, for example, a rectifier, a filter, and a voltage regulator.

In an exemplary embodiment, the power manager 606 includes a power monitor 606a and a power controller 606b. In an exemplary embodiment, the power monitor 606a is operably coupled to the output of the power dispenser and conditioner 602 for monitoring the available power, $P(t)_{avail}$. In an exemplary embodiment, the power monitor 606a is also operably coupled to the power controller 606b for communicating the available power, $P(t)_{avail}$, to the power controller. In an exemplary embodiment, the power controller 606b is also operably coupled to the power allocator 608 for controlling the operation of the power allocator.

In an exemplary embodiment, the power allocator 608 includes one or more allocators 608i that are each coupled to one or more elements of the sensor node 102 for controllably supplying power to the corresponding elements of the sensor node. In this manner, the power manager 606 and the power allocator 608 collectively determine the power available to the sensor node 102 and then allocate the available power to the elements of the sensor node.

In an exemplary embodiment, the system 600 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, the power manager 606, and the power allocator 608 may be provided within one or more of the sensor nodes 102 and/or provided within the central controller 104.

Figure 7:
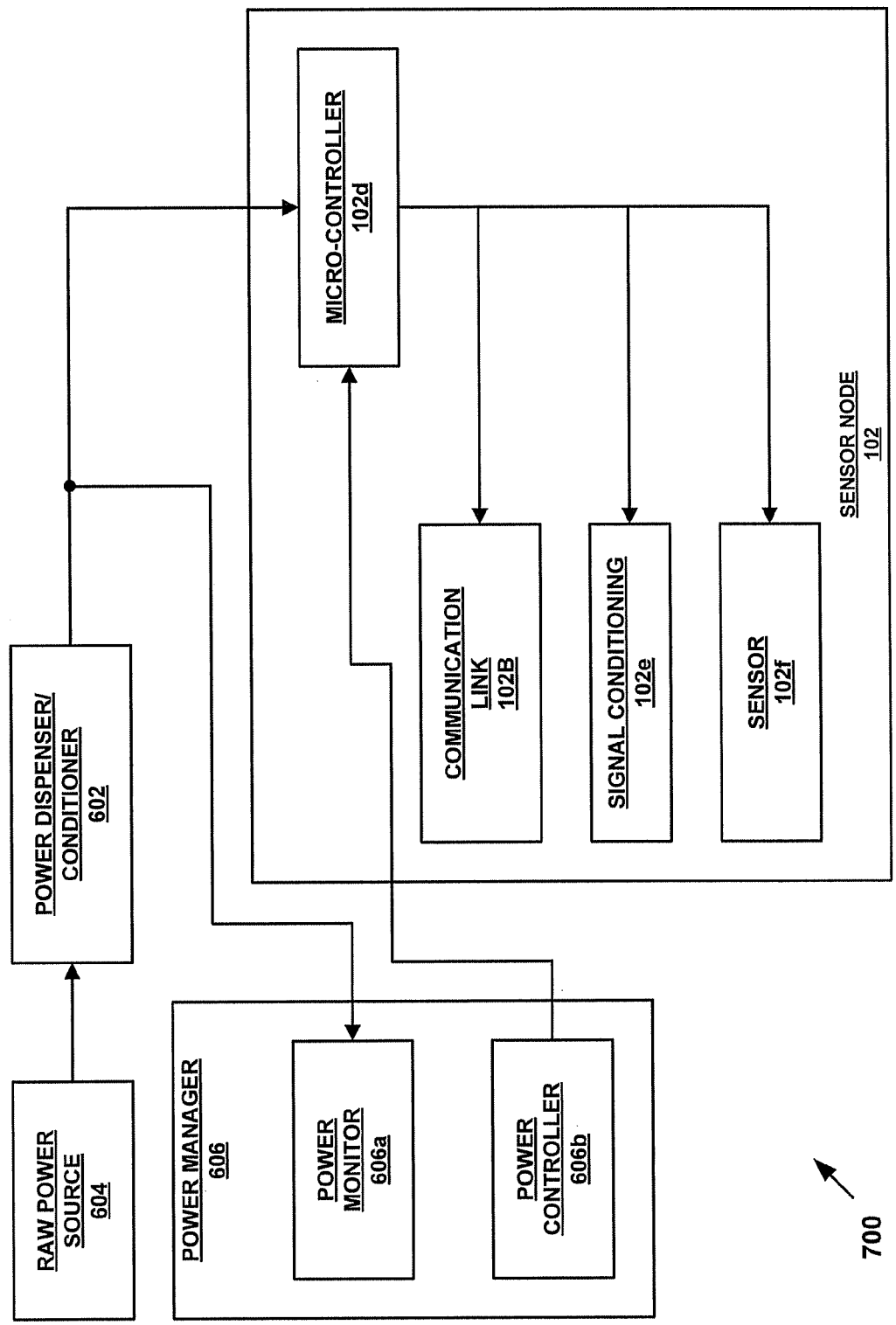
FIG. 7 is a schematic illustration of an exemplary embodiment of an aircraft monitoring system.

Referring now to FIG. 7, an exemplary embodiment of a system 700 for monitoring an aircraft is substantially identical in design and operation as the system 600 except that the power allocator 608 is omitted and the functionality formerly provided by the power allocator is provided by the micro-controller 102d within the sensor nodes 102.

In particular, in the system 700, the power controller 606b is operably coupled to the micro-controller 102d of the sensor node 102 for directing the allocation of the available power by the micro-controller to the elements of the sensor node.

In an exemplary embodiment, the system 700 may implement one or more aspects of the methods 400 and 500, described and illustrated above with reference to FIGS. 4a, 4b, 5a, and 5b. In an exemplary embodiment, the elements and functionality of the power dispenser and conditioner 602, the raw power source 604, and the power manager 606 may be provided within one or more of the sensor nodes 102 and/or provided within the central controller 104.

Figure 8:
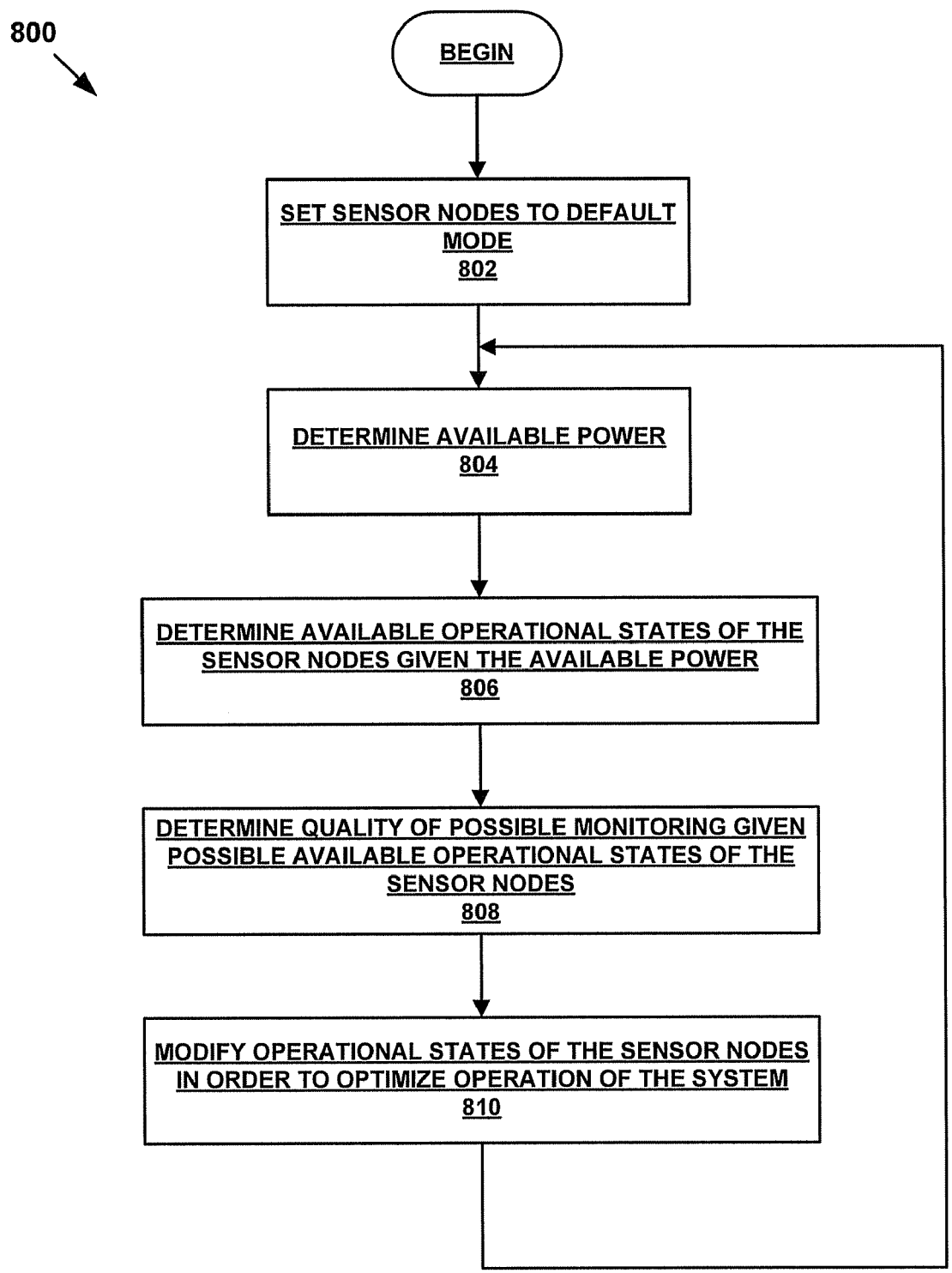
FIG. 8 is a flow chart illustration of a method of operating an aircraft monitoring system.

Referring now to FIG. 8, in an exemplary embodiment, one or more of the systems 100, 600, and 700 may implement a method 800 of operating in which, in 802, the sensor nodes 102 are placed into a default mode of operation which may, for example, include a sleep mode in which the sensor node is inactive, a fully active mode in which the sensor node is fully active, or one or more intermediate active modes in which the sensor node has functionality that is less than in the fully active mode. In 804, the system, 100, 600, or 700, will then determine the amount of power available to the system. In an exemplary embodiment, in 806, the system, 100, 600, or 700, will then determine the available operational states of the sensor nodes 102 of the system given the amount of power available to the system.

In an exemplary embodiment, in 808, the system, 100, 600, or 700, will then determine the quality of the possible monitoring of the aircraft 108 given the available operational states of the sensor nodes 102 of the system given the amount of power available to the system. In an exemplary embodiment, the quality of the possible monitoring of the aircraft 108 may be a function of what monitoring is adequate based upon the operating envelope and actual operating condition of the aircraft. For example, when the aircraft 108 is cruising at high altitudes with minimal turbulence, the level of detail and sampling rate in the monitored conditions may be less than when the aircraft is climbing to, or diving from, altitude with heavy turbulence.

In an exemplary embodiment, in 810, the system, 100, 600, or 700, will then modify the operational states of the sensor nodes 102 in order to optimize one or more of: 1) the available operational states of the sensor nodes, 2) the volume of data collected by the sensor nodes, 3) the sampling rate of the data collected by the sensor nodes, 4) the communication throughput of data within the network 106, and/or 5) the quality of the possible monitoring.

In an exemplary embodiment, during the operation of the systems, 100, 600 and/or 700, the switches, 102c, 102g and 102h, may be operated by the micro-controller 102d to place the sensor node 102 in a sleep mode by not permitting operation of the communication link 102b and the sensor 102f. In this manner, the use of power by the sensor node 102 is minimized.

In an exemplary embodiment, during the operation of the systems, 100, 600 and/or 700, the sensor node 102 may be operated in a sleep mode of operation that may, for example, include a range of sleeping mode that may vary from a deep sleep to a light sleep. In an exemplary embodiment, in a deep sleep mode of operation, the sensor node 102 may be completely asleep and then may be awakened by a watch dog timer, or other alert. In an exemplary embodiment, in a light sleep mode of operation, some of the functionality of the sensor node 102 may be reduced. In an exemplary embodiment, in one or more intermediate sleeping modes of operation, the functionality of the sensor node 102 will range from a standby mode, to a light sleep, to a deep sleep.

In an exemplary embodiment, in one or more of the systems 100, 600 and 700, one or more of the elements and functionality of the power dispenser and conditioner 602, the raw power source 604, the power manager 606, and the power allocator 608 may be provided within a sensor node 102, within one or more groups of sensor nodes, and/or within the central controller 104.

In an exemplary embodiment, in one or more of the systems, 100, 600 and 700, one or more of the elements and functionality of the raw power source 604 may be provided within a single sensor node 102, within one or more groups of sensor nodes, or by all of the sensor nodes. For example, if the power supply 102a in each of the sensor nodes 102 within one of the systems, 100, 600 or 700, is a solar cell, then the level of solar energy at each sensor node 102 will vary as a function of its location on the aircraft 108. In an exemplary embodiment, the allocation of power within the sensor nodes 102 of the systems, 100, 600 and 700, will determine the mapping of the power generated by the sensor nodes and then allocate power among the sensor nodes in order to optimize the operation of the systems in monitoring the aircraft 108.

In an exemplary embodiment, in one or more of the systems 100, 600 and 700, one or more of the sensor nodes 102 may provide one or more of the elements and functionality of the central controller 104.

In an exemplary embodiment, one or more of the systems 100, 600 and 700, may be operated to provide an optimal quality of the possible monitoring of the aircraft 108 by placing one or more determined sensor nodes 102 into a sleep mode, even in the presence of adequate power to operate the determined sensor nodes if the systems determine that the optimal quality of the possible monitoring of the aircraft can still be achieved. In this manner, the determined sensor nodes 102 placed into a sleep mode may do one or more of: store power or store data within the determined sensor node. In this manner, data may be warehoused within a sensor node 102 for later use and/or power may be stored within the sensor node for later use.

In an exemplary embodiment, one or more of the systems 100, 600 and 700, may be operated to place one or more determined sensor nodes 102 into a sleep mode if the data for the determined sensor node may be extrapolated using the data available for adjacent sensor nodes.

Figure 9A:
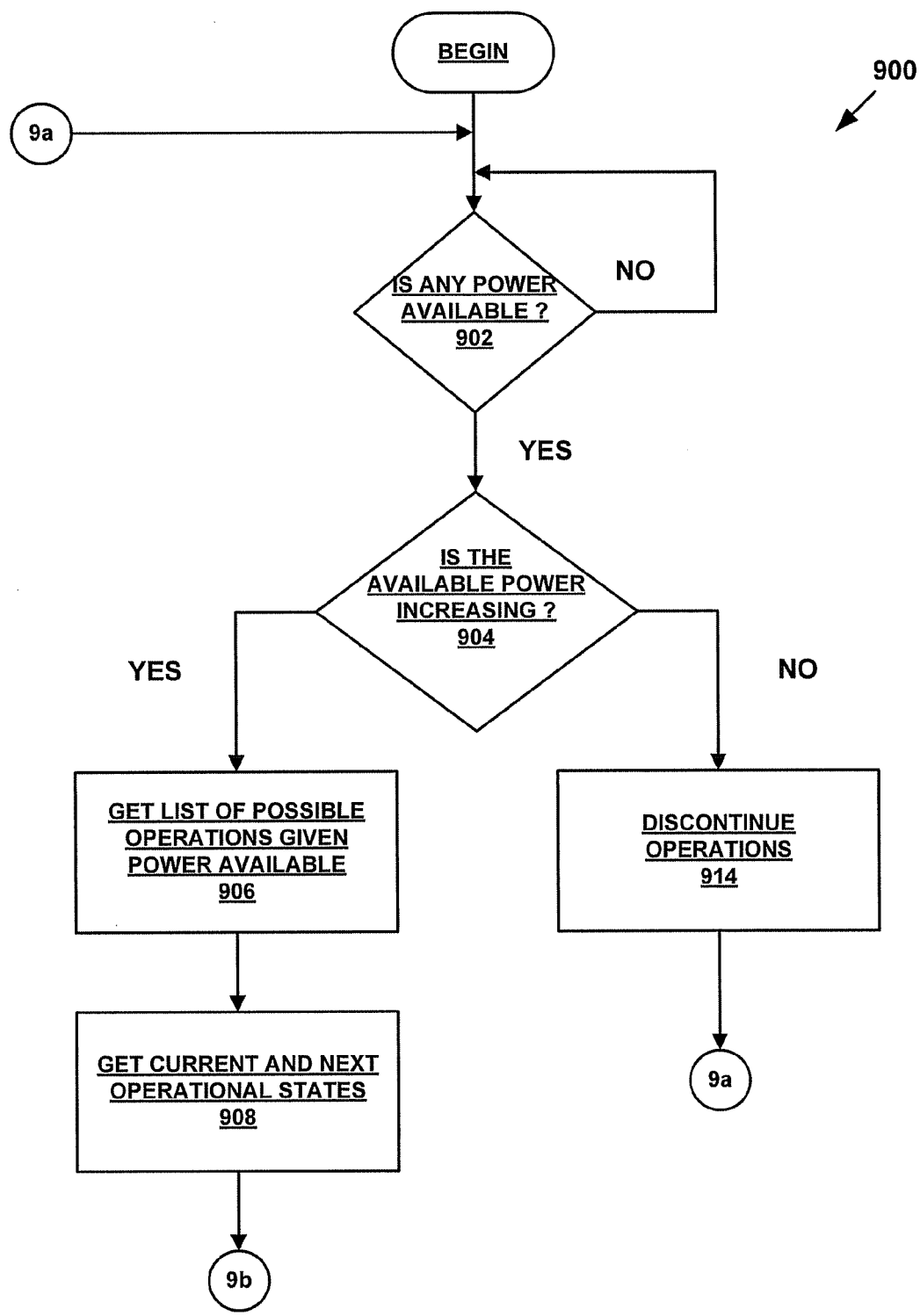
FIGS. 9a and 9b are flow chart illustrations of an exemplary embodiment of a method of operating the sensor nodes of FIG. 3.
Figure 9B:
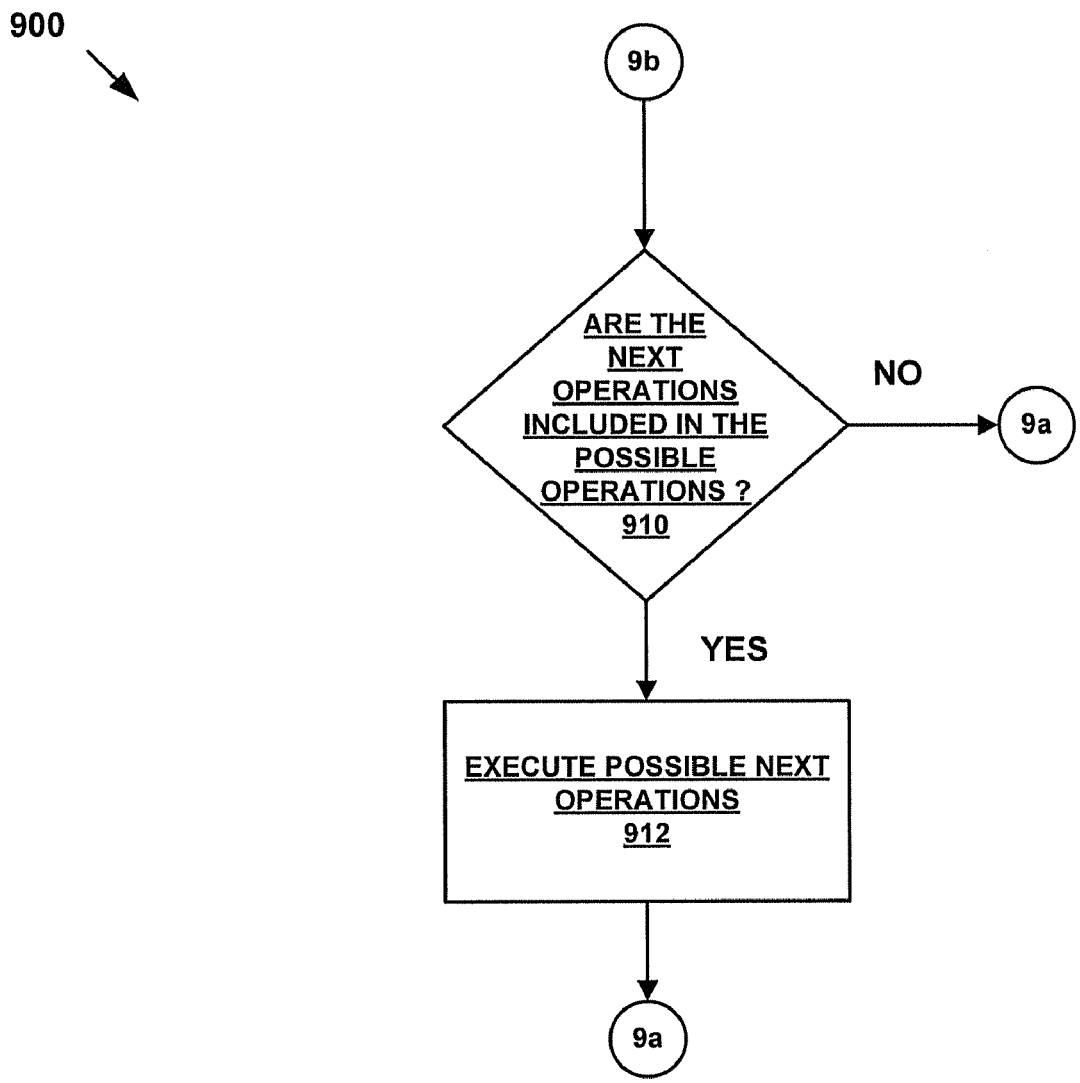

Referring now to FIGS. 9a and 9b, in an exemplary embodiment, one or more of the sensor nodes 102 of the system 100 implement a method 900 of operating in which, in 902, the sensor node determines if there is any power available to the sensor node. If there is any power available to the sensor node 102, then the sensor node determines if the power available to the sensor node is increasing or decreasing in 904.

If the power available to the sensor node 102 is increasing, then the sensor node gets a listing of the possible operations given the amount of available power in 906. The sensor node 102 then gets a listing of the current and next operational states for the sensor node in 908.

The sensor node 102 then determines if the next operational states of the sensor node are included in the possible operations given the amount of available power in 910. If the next operational states of the sensor node 102 are included in the possible operations given the amount of available power, then the sensor node executes the next operational states that are possible to execute given the amount of available power in 912.

Alternatively, if the power available to the sensor node 102 is not increasing, or is increasing at a rate below a predetermined value, then the sensor node discontinues operations in 914.

Figure 10A:
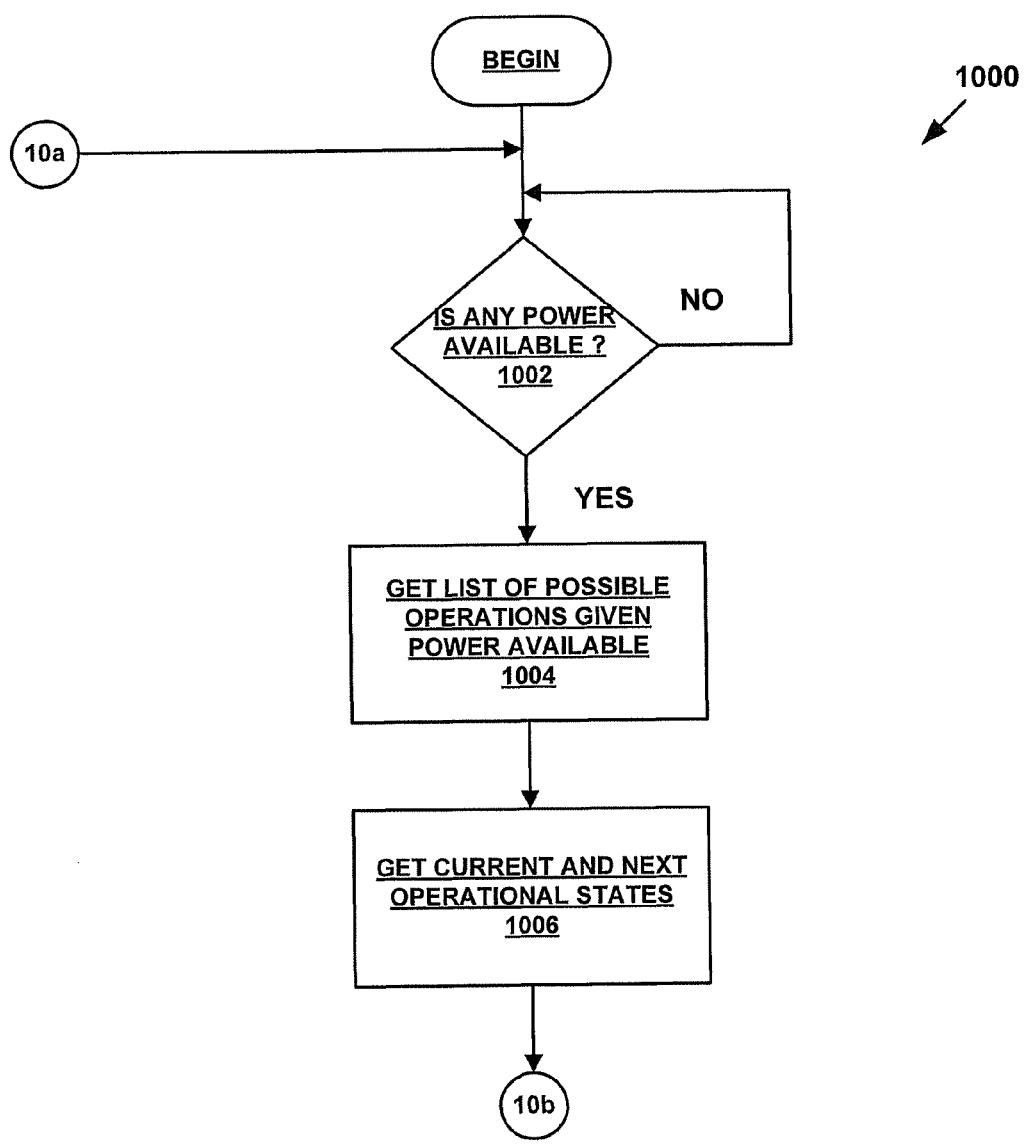
FIGS. 10a and 10b are flow chart illustrations of an exemplary embodiment of a method of operating the sensor nodes of FIG. 3.
Figure 10B:
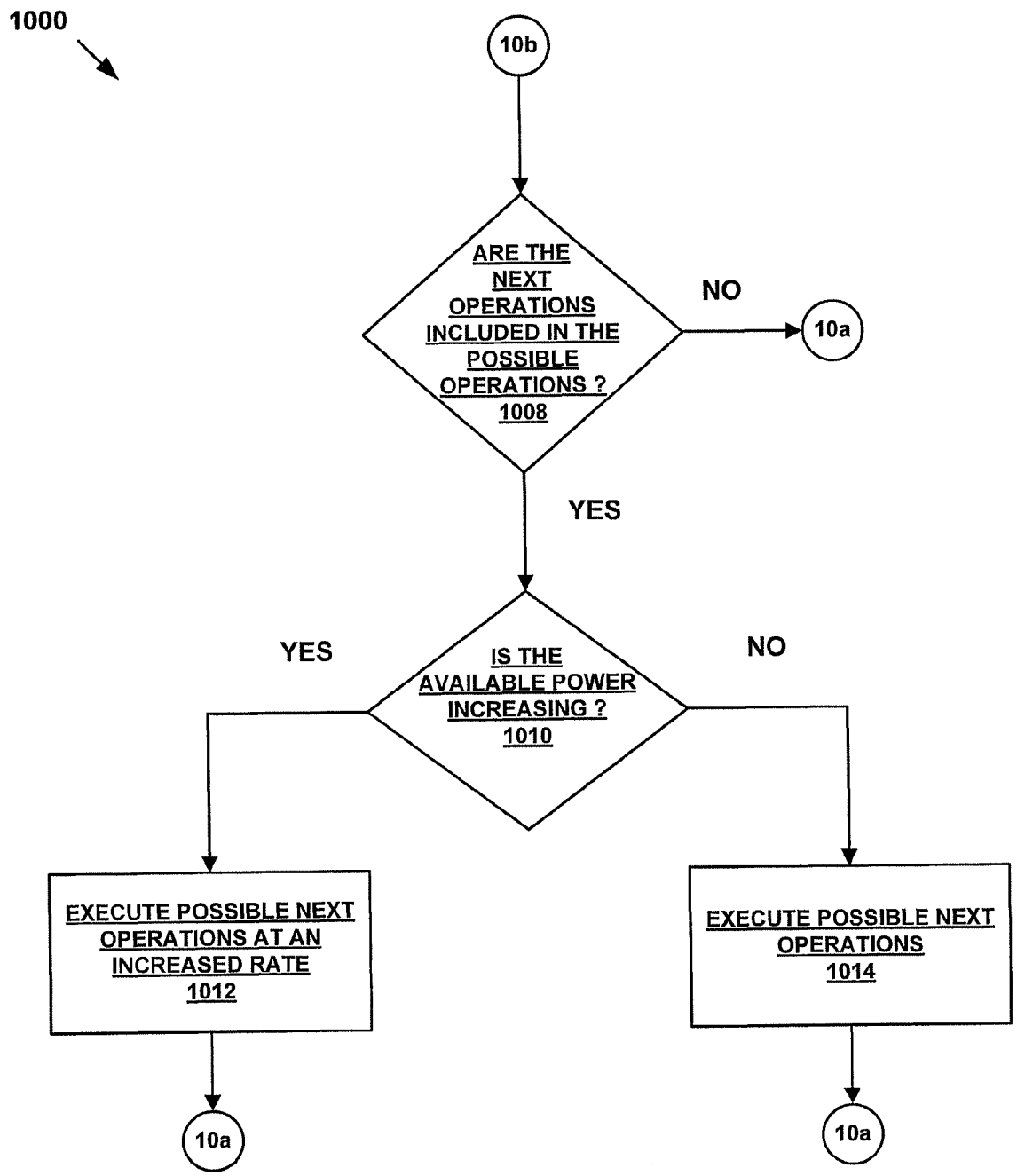

Referring now to FIGS. 10a and 10b, in an exemplary embodiment, one or more of the sensor nodes 102 of the system 100 implement a method 1000 of operating in which, in 1002, the sensor node determines if there is any power available to the sensor node. If there is any power available to the sensor node 102, then the sensor node gets a listing of the possible operations given the amount of available power in 1004. The sensor node 102 then gets a listing of the current and next operational states for the sensor node in 1006.

The sensor node 102 then determines if the next operational states of the sensor node are included in the possible operations given the amount of available power in 1008. If the next operational states of the sensor node 102 are included in the possible operations given the amount of available power, then the sensor node determines if the power available to the sensor node is increasing or decreasing in 1010.

If the power available to the sensor node 102 is increasing, then the sensor node executes the next operational states that are possible at an increased rate of execution in 1012. In an exemplary embodiment, the operational states that may be executed at an increased rate of execution in 1012 may, for example, include a sampling rate of data and/or a communication rate of data by the sensor node 102.

Alternatively, if the power available to the sensor node 102 is not increasing, then the sensor node executes the next operational states that are possible at a baseline rate of execution in 1014. In an exemplary embodiment, if the power available to the sensor node is not increasing, or is increasing at a rate below a predetermined minimum rate, the sensor node may decrease the rate of execution.

Figure 11A:
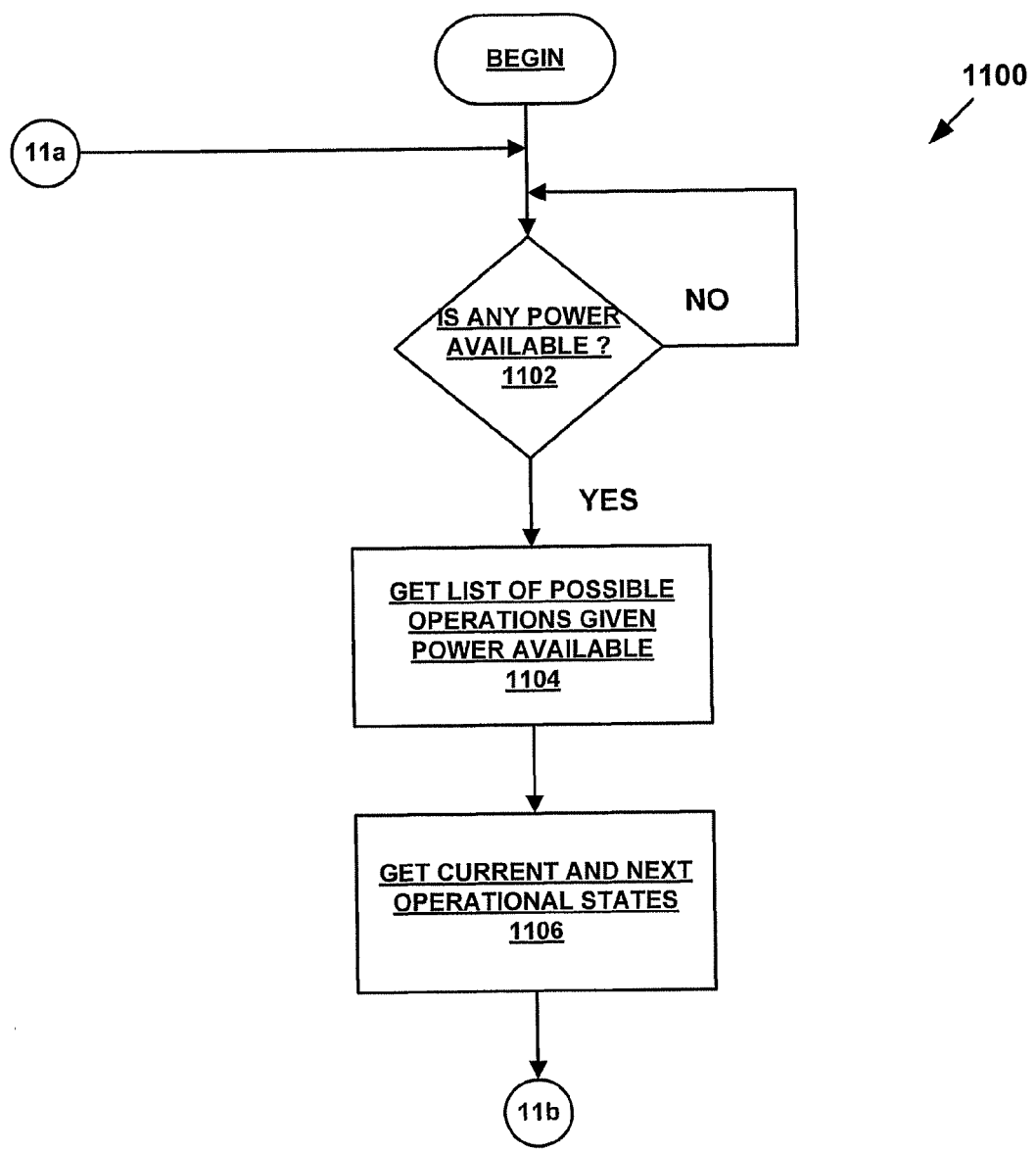
FIGS. 11a and 11b are flow chart illustrations of an exemplary embodiment of a method of operating the sensor nodes of FIG. 3.
Figure 11B:
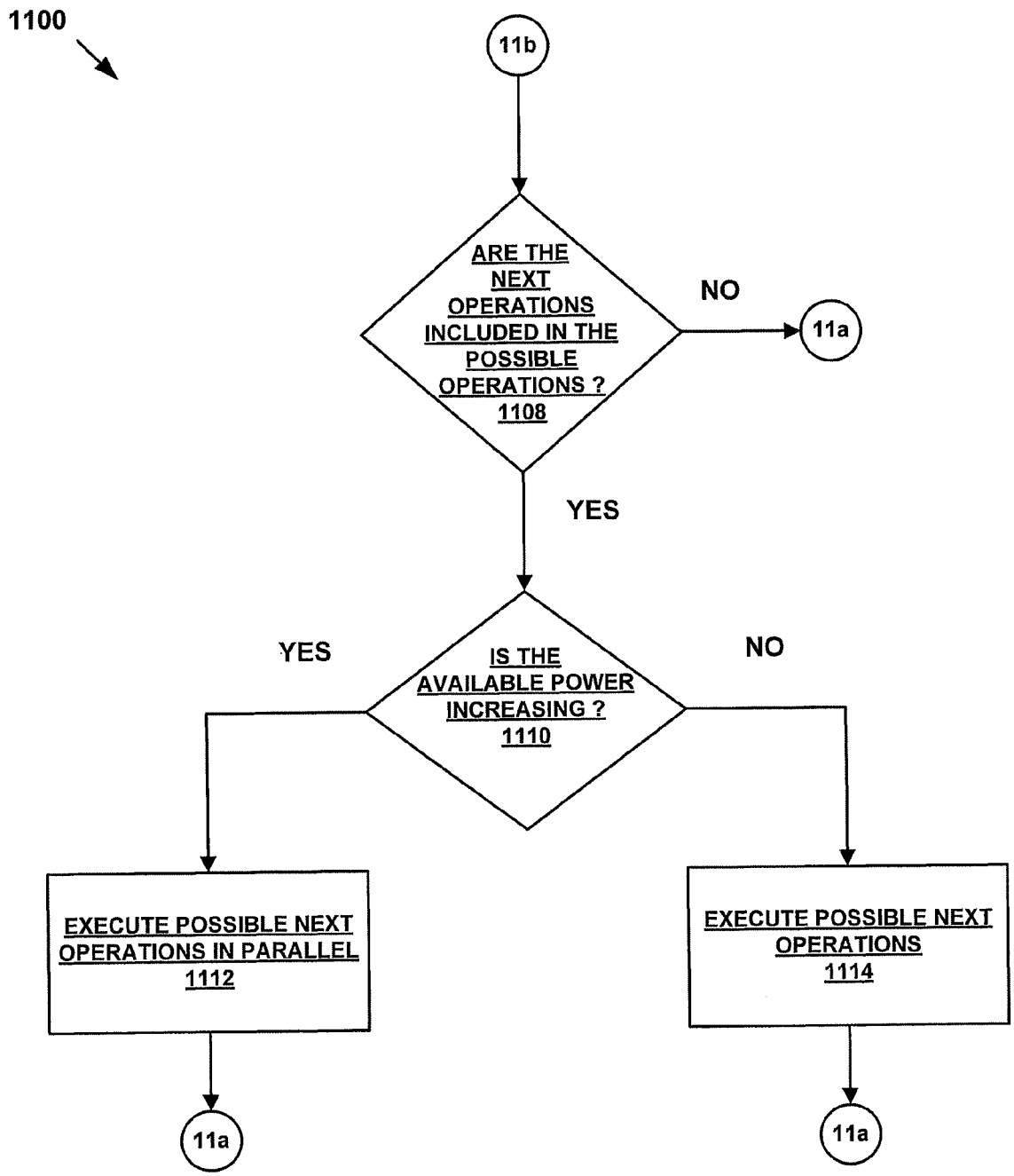

Referring now to FIGS. 11a and 11b, in an exemplary embodiment, one or more of the sensor nodes 102 of the system 100 implement a method 1100 of operating in which, in 1102, the sensor node determines if there is any power available to the sensor node. If there is any power available to the sensor node 102, then the sensor node gets a listing of the possible operations given the amount of available power in 1104. The sensor node 102 then gets a listing of the current and next operational states for the sensor node in 1106.

The sensor node 102 then determines if the next operational states of the sensor node are included in the possible operations given the amount of available power in 1108. If the next operational states of the sensor node 102 are included in the possible operations given the amount of available power, then the sensor node determines if the power available to the sensor node is increasing or decreasing in 1110.

If the power available to the sensor node 102 is increasing, then the sensor node executes the next operational states that are possible in parallel in 1112. Alternatively, if the power available to the sensor node 102 is not increasing, then the sensor node executes the next operational states that are possible in series in 1114.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. One or more elements of the exemplary embodiments may be combined, in whole or in part, with one or more elements of one or more of the other exemplary embodiments. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A distributed monitoring system for monitoring one or more operating conditions of a structure, comprising:
   one or more sensor nodes coupled to the structure, each sensor node comprising:
      a power supply;
      a sensor operably coupled to the power supply for sensing one or more operating conditions of the structure in the immediate environment and for sensing whether or not the power level of the power supply is increasing; and
      a communications interface operably coupled to the power supply and the sensor for communicating the sensed operating conditions of the structure;
   a communication network operably coupled to the sensor nodes; and
   a controller operably coupled to the communication network for monitoring the sensor nodes.

2. The system of claim 1, wherein the sensor is configured to determine whether the amount of available power provided by the power supply is increasing; and wherein the sensor is configured to control the operation of the sensor as a function of whether or not the amount of available power is increasing.

3. The system of claim 2, wherein the sensor is configured to execute one or more operations responsive to determining, that the amount of available power is increasing.

4. The system of claim 3, wherein the sensor is configured to execute one or more operations at an increased rate of execution when the amount of available power is increasing.

5. The system of claim 4, wherein the controller is configured to direct the sensor to execute a plurality of operations in parallel responsive to determining that the amount of available power is increasing.

6. The system of claim 3, wherein the controller is configured to direct the sensor to execute a plurality of operations in parallel responsive to determining that the amount of available power is increasing.

7. The system of claim 2, wherein the sensor is configured to discontinue execution of operations responsive to determining that the amount of available power is not increasing.

8. The system of claim 2, wherein the controller is configured to direct the sensor to execute one or more operations at an increased rate of execution responsive to determining that the amount of available power is increasing.

9. The system of claim 8, wherein the controller is configured to direct the sensor to execute a plurality of operations in parallel responsive to determining that the amount of available power is increasing.

10. The system of claim 2, wherein the controller is configured to direct the sensor to execute one or more operations at a baseline rate of execution responsive to determining that the amount of available power is not increasing.

11. The system of claim 10, wherein the controller is configured to direct the sensor to execute operations in series responsive to determining that the amount of available power is not increasing.

12. The system of claim 2, wherein the controller is configured to direct the sensor to execute a plurality of operations in parallel responsive to determining that the amount of available power is increasing.

13. The system of claim 2, wherein the controller is configured to direct the sensor to execute operations in series responsive to determining that the amount of available power is not increasing.

14. The system of claim 2, wherein the controller is configured to direct the sensor to execute operations at a decreasing rate responsive to determining that the amount of available power provided by the power supply is not increasing.

15. The system of claim 2, wherein the controller is configured to direct the sensor to execute operations at a decreasing rate responsive to determining that the amount of avail- 16. The system of claim 1, wherein the sensor node is configured to dynamically adjust the operation of the sensor to limit use to no more than the amount of available power provided by the power supply to prevent excess power depletion.

17. The system of claim 16, wherein the sensor is configured to choose the operation of the sensor node based on a priority list.

18. The system of claim 17, wherein a factor used to determine the priority list is based on achieving a minimum power usage, wherein power usage is defined by ($Power_{In}$-$Power_{Out}$) divided by (Energy Inertia).

19. The system of claim 1, wherein the controller is configured to dynamically adjust the operation of the sensor node to limit use no more than the amount of available power provided by the power supply to prevent excess power depletion.

20. The system of claim 19, wherein the controller is configured to choose the operation of the sensor node based on a priority list.

21. The system of claim 20, wherein a factor used to determine the priority list is based on achieving a minimum power usage, wherein power usage is defined by $Power_{In}$-$Power_{Out}$ divided by Energy Inertia.

22. A method of operating a system for monitoring one or more operating conditions of a structure, comprising:
providing power at sensors positioned around the structure;
determining if the power provided to one or more of the sensors is increasing; and
controlling the operation of the sensors as a function of whether or not the power provided to one or more of the sensors in increasing.

23. The method of claim 22, further comprising one or more of the sensors executing one or more operations responsive to determining that the amount of available power to the one or more sensors is increasing.

24. The method of claim 23, further comprising one or more of the sensors executing one or more operations at an increased rate of execution responsive to determining that the amount of available power to the one or more of the sensors is increasing.

25. The method of claim 24, further comprising one or more of the sensors executing a plurality of operations in parallel responsive to determining that the amount of available power to the one or more sensors is increasing.

26. The method of claim 23, further comprising one or more of the sensors executing a plurality of operations in parallel responsive to determining that the amount of available power to the one or more sensors is increasing.

27. The method of claim 22, further comprising one or more of the sensor discontinuing execution of operations responsive to determining that the amount of available power to the one or more sensors is not increasing.

28. The method of claim 22, further comprising one or more of the sensors executing one or more operations at an increased rate of execution responsive to determining that the amount of available power to the one or more sensors is increasing.

29. The method of claim 28, further comprising one or more of the sensors executing a plurality of operations in parallel responsive to determining that the amount of available power to the one or more sensors is increasing.

30. The method of claim 22, further comprising one or more of the sensors executing one or more operations at a baseline rate of execution responsive to determining that the amount of available power to the one or more sensors is not increasing.

31. The method of claim 30, further comprising one or more of the sensors executing operations in series responsive to determining that the amount of available power to the one or more sensors is not increasing.

32. The method of claim 22, further comprising one or more of the sensors executing a plurality of operations in parallel responsive to determining that the amount of available power to the one or more sensors is increasing.

33. The method of claim 22, further comprising one or more of the sensors executing operations in series responsive to determining that the amount of available power to the one or more sensors is not increasing.

34. A sensor node for use in a distributed monitoring system for monitoring one or more operating conditions of a structure, comprising:
a power supply;
a sensor operably coupled to the power supply for sensing one or more operating conditions of the structure in the immediate environment and for sensing whether or not the power level of the power supply is increasing;
a controller operably coupled to a communication network for monitoring the sensor nodes; and
a communications interface operably coupled to the power supply and the sensor for communicating the sensed operating conditions of the structure.

35. The sensor node of claim 34, wherein the sensor is configured to determine the whether the amount of available power provided by the power supply is increasing; and wherein the sensor is configured to control the operation of the sensor as, a function of whether or not the amount of available power is increasing.

36. The sensor node of claim 35, wherein the sensor is configured to execute one or more operations responsive to determining that the amount of available power is increasing.

37. The sensor node of claim 36, wherein the sensor is configured to execute one or more operations at an increased rate of execution responsive to determining that the amount of available power is increasing.

38. The sensor node of claim 37, wherein the controller is configured to direct the sensor to execute a plurality of operations in parallel responsive to determining that the amount of available power is increasing.

39. The sensor node of claim 36, wherein the controller is configured to direct the sensor to execute a plurality of operations in parallel responsive to determining that the amount of available power is increasing.

40. The sensor node of claim 35, wherein the sensor is configured to discontinue execution of operations responsive to determining that the amount of available power is not increasing.

41. The sensor node of claim 35, wherein the controller is configured to direct the sensor to execute one or more operations at an increased rate of execution responsive to determining that the amount of available power is increasing.

42. The sensor node of claim 41, wherein the controller is configured to direct the sensor to execute a plurality of operations in parallel responsive to determining that the amount of available power is increasing.

43. The sensor node of claim 35, wherein the controller is configured to direct the sensor to execute one or more operations at a baseline rate of execution responsive to determining that the amount of available power is not increasing.

44. The sensor node of claim 43, wherein the controller is configured to direct the sensor to execute operations in series responsive to determining that the amount of available power is not increasing.

45. The sensor node of claim 35, wherein the controller is configured to direct the sensor to execute a plurality of operations in parallel responsive to determining that the amount of available power is increasing.

46. The sensor node of claim 35, wherein the controller is configured to direct the sensor to execute operations in series responsive to determining that the amount of available power is not increasing.

47. The sensor node of claim 35, wherein the controller is configured to direct the sensor to execute a plurality of operations at a decreasing rate responsive to determining that the amount of available power provided by the power supply is not increasing.

48. The sensor node of claim 35, wherein the controller is configured to direct the sensor to execute a plurality of operations at a decreasing rate responsive to determining that the amount of available power provided by the power supply is increasing by a rate that is less than a predetermined rate.

* * * * *